May 12, 1931.  G. T. JACOCKS  1,804,936
SYSTEM OF HEAT INTERCHANGE
Filed Jan. 27, 1928  2 Sheets-Sheet 2
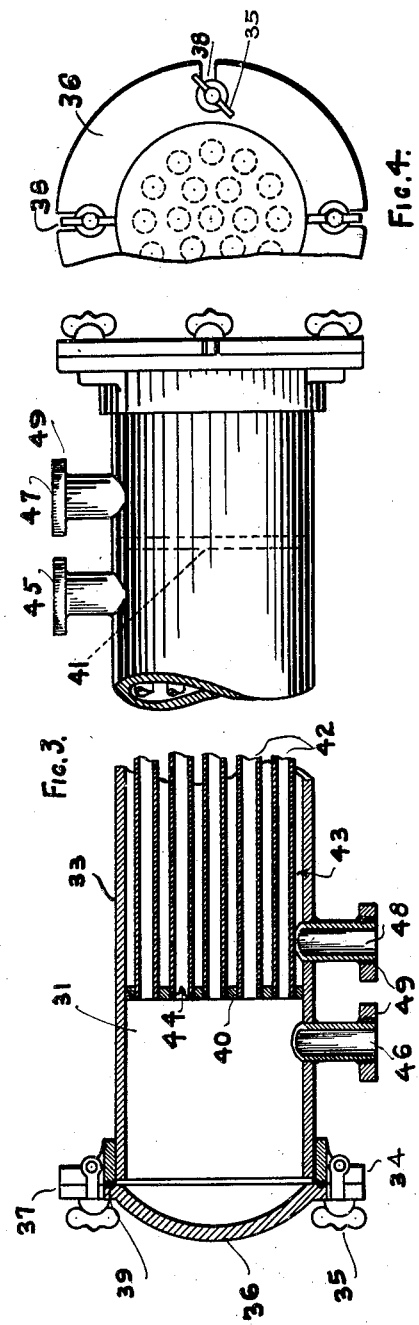
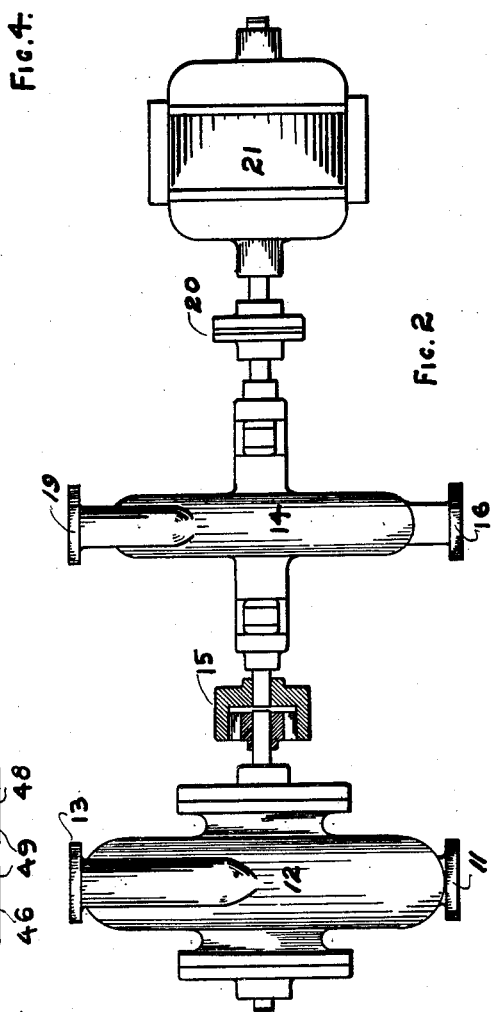

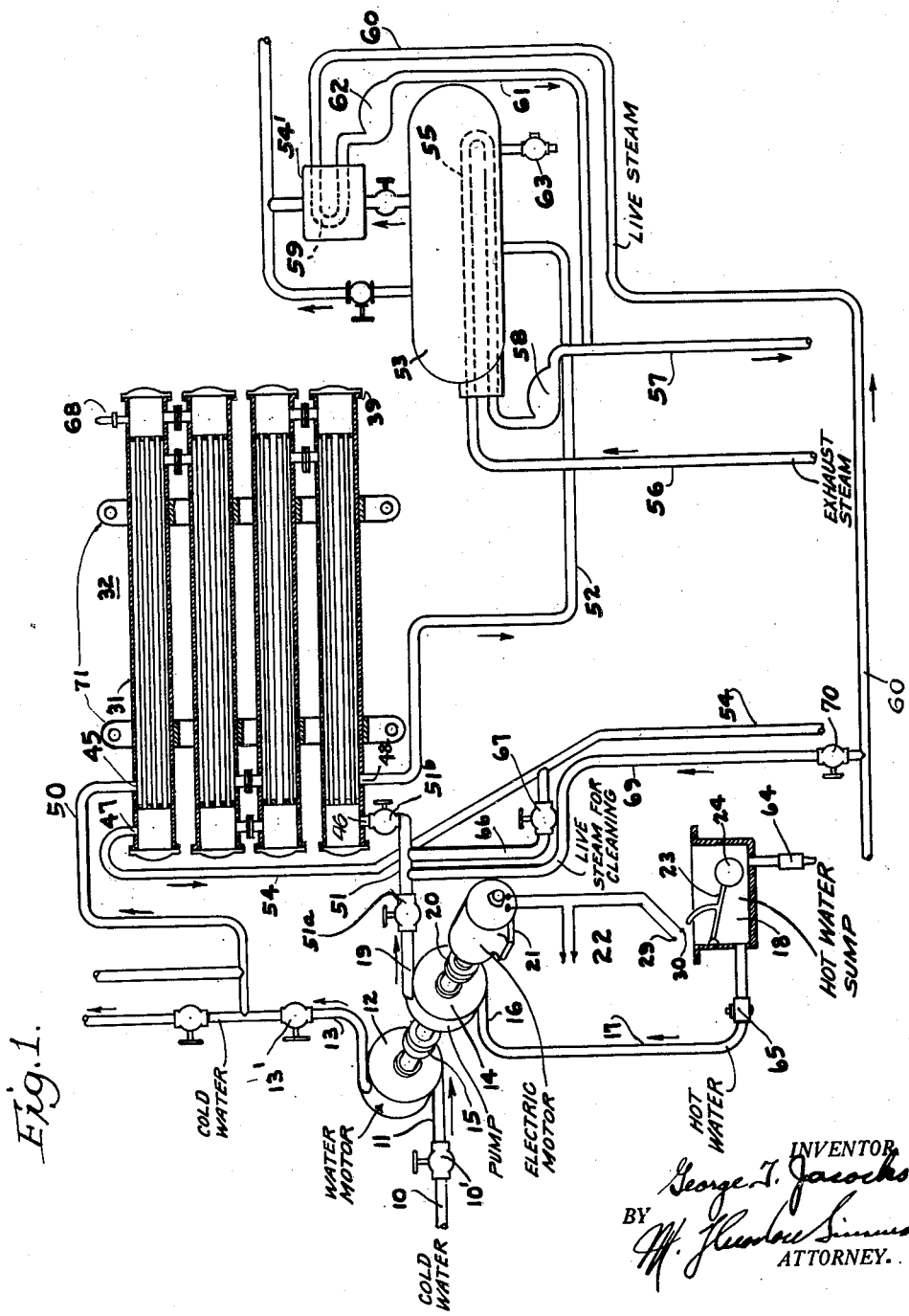

Patented May 12, 1931

1,804,936

UNITED STATES PATENT OFFICE

GEORGE T. JACOCKS, OF BROOKLYN, NEW YORK, ASSIGNOR, BY MESNE ASSIGNMENTS, TO ALCO PRODUCTS INCORPORATED, OF NEW YORK, N. Y., A CORPORATION OF DELAWARE

SYSTEM OF HEAT INTERCHANGE

Application filed January 27, 1928. Serial No. 249,924.

My invention pertains to a system of heat interchange and proposes a system for utilizing heat and energy now wasted in plants using substantial quantities of water, such as commercial laundries.

Systems have heretofore been proposed aiming at accomplishment of the results attained by my invention, but such systems have been inefficient so that the investment in the installation and operation thereof did not result in any financial saving to the plant using such conservation apparatus. Furthermore, such systems have involved cumbersome apparatus that took up space which could otherwise be used in commercial activities of the company. Hence, such systems have not been practical.

It is the principal object of my invention to provide a system that will properly conserve and utilize all of the heat and energy now normally wasted in plants.

It is another object of my invention to provide such a system to be used in conjunction with apparatus now in common use in such plants thus conserving the coal supply or other heat generating force.

It is a further object of my invention to provide a system that will utilize the incoming cold water to operate a pump to empty the waste receptacles.

It is a still further object of my invention to provide a system whereby the incoming cold water will be passed in efficient heat exchanging relation with the waste water thus preheating the incoming cold water.

It is a still further object of my invention to provide a system of heating water that utilizes waste heats and may have two or three heaters of varying temperatures as requirements may demand.

It is a still further object of my invention to provide a heat interchanger of simple construction that can be suspended either on the wall or ceiling of the plant or otherwise placed so as to occupy space that is not normally used in the operation of the plant and that can be readily cleaned.

It is a still further object of my invention to provide a heat interchanger unit of such construction that a heat interchanger of any size may be made by connecting a plurality of the units together.

My system will be briefly described as applied to a commercial laundry wherein the waste water from the laundry apparatus is emptied into a central sump. It will be apparent that my system is not limited to such application, but that the same is chosen merely for convenience of description.

My system contemplates connecting a centrifugal pump to a pipe leading from the waste sump so as to empty the same. The pump will have two power sources; one, an electrical motor, and the other, a water motor or turbine.

The outlet from the turbine connects to all cold water requirements of the plant and also to one side of a preheater. The outlet from the waste water pump connects to the other side of the preheater. The waste water outlet from the preheater connects directly to the sewer.

The clear water leaves the preheater and passes to a second heater from which the hot water requirements may be taken. My system contemplates using the exhaust steam from the boiler room as the source of energy in this second heater.

At times it may be desirable or necessary to further heat the water after leaving the exhaust steam heater. My system provides a third or instantaneous heater in a branch of the outlet line from the exhaust steam heater. In my system the instantaneous heater is supplied with the live steam from the boiler system of the plant.

All of the heaters may be of the heat interchanger type specifically described hereinafter for the preheater. Also, provisions are made for cleaning the apparatus.

My invention will be best understood by reference to the accompanying drawings wherein—

Figure 1 is a schematic view of my heat exchange system;

Fig. 2 is a detail of the fluid prime movers;

Fig. 3 is a detail partly in elevation and partly in section of my preheater unit, and Fig. 4 is a partial end view of the preheater.

Referring to Fig. 1, the numeral 10 indicates a supply line for tap water from the water mains and connects directly with the intake port 11 of a fluid motor 12 through the valve 10'. The fluid motor is provided with an outlet port 13 that is connected to the supply pipe for all cold water requirements and also to the requirements for heated clear water as will be described hereinafter.

A fluid pump 14 which may be of the centrifugal type, is operatively connected to said fluid motor 12 by a clutch 15 of the overrunning type. The fluid pump is intended to circulate heated waste water and for this purpose is provided with an intake 16 that is connected by pipe 17 with a waste water sump 18. The sump 18 is arranged to be supplied in any suitable manner with the hot water that is dumped from the laundry tubs and machines.

An electric motor 21 is connected to the pump 14 by means of a coupling 20 which may be of the slip clutch or any other type that will permit the pump rotor to be rotated independently of the electric motor. The motor 21 is supplied from current mains 22 and is controlled by a float operated switch 23 located in the sump 18 and adapted to control contacts 29 and 30.

The float switch is so arranged that the electric motor will be energized to operate the pump 14 to empty the sump whenever the water turbine 12 is not operating the pump at sufficient speed for this purpose. The fluid pump 14 is also provided with an outlet port 19.

A series of unit preheaters 31 of the single pass type are indicated as a whole by numeral 32. Since each of the units is identical, it will suffice to describe one unit, which will be done in conjunction with Figs. 3 and 4 where the preheater unit is shown in detail.

Each unit consists of tubular body members 33 having flanged ends 34. The unit is closed by concave end plates 36 having flanged edges 37, cooperating with the flanged ends 34. Pivoted to the ends 34 are the bolt portions of thumb screws 35 which engage with radial slots 38 in the flanges 37 to draw said end plates 36 into compression contact with the body member 33 and a gasket 39.

Secured interiorly of said body member 33 are perforate partition members 40 and 41 respectively adjacent each end thereof and which are adapted to receive tubes 42 in said perforations in a manner well known in the art. Two contacting passages, 43 and 44, are thus formed in the unit. Communicating with the passages 43 and 44 are inlet connections 45 and 46 and outlet connections 48 and 47 respectively, each of which is provided with detachable flange connectors 49 of well known form.

A pipe 50 connects the outlet 13 of the water motor 12 with the inlet 45 of the preheater 32, thus supplying cold water to that portion of the preheater. The pipe 51, having valves 51a and 51b therein, connects the outlet 19 of the pump 14 with the inlet 46 of the preheater 32, thus supplying hot waste water to that portion of the preheater. It will be noted that the hot water inlet 46 is adjacent the clear water outlet 48 and the reverse condition obtains at the opposite end of the preheater 31.

The outlet 48 is connected by the pipe 52 to the bottom of a master heater 53 and an auxiliary heater 54 to be hereinafter described. The outlet 47 of the heater 31 connects by pipe 54 to the sewer.

The master heater obtains its heat from a circulation coil 55 that is connected through pipe 56 to a source of steam which is preferably the exhaust steam from the boiler room of the plant. The return pipe 57 from the coil 55 is provided with a trap 58 for maintaining a pressure in the coil 55.

The auxiliary heater 54 is preferably a high temperature device, and in my system the coil 59 thereof is supplied through pipe 60 with live steam also obtained from the boiler room of the plant. The return line 61 from the coil 59 is provided with a trap 62 for maintaining a pressure in the coil 59. The traps 58 and 62 may be of any conventional type.

The master heater 53 is provided with a drain plug 63 and the sump 18 is provided with a drain plug 64. The outlet pipe 17 from the sump 18 is provided with a check valve 65.

When the plant is to be closed down for the day, the waste water from the apparatus need not be circulated through the preheater. At this time the valve 51b is closed and the waste water is discharged through by-pass 66, the valve 67 therein being opened for this purpose, into pipe 54 which is connected to the sewer outlet for the plant.

After the waste water is entirely discharged from the sump 18, the preheater 32 may be drained by closing valve 51a and opening valve 51b. The waste water in the preheater 32 will thus drain out through the by-pass 66 to the sewer outlet. For the purposes of draining, an air valve 68 is provided in the preheater, as shown in Fig. 1.

When it is desired to clean the preheater, I provide a connecting pipe 69 from the live steam line 60 for this purpose. When this operation is desired, the valve 13' in the cold water supply pipe and valve 51a are closed, and valve 70 in pipe 69 is opened thus permitting the live steam to circulate through the preheater 32 and exhaust to the sewer outlet through pipe 54. Of course, the valve 51b must be opened. By closing valve 51b and opening valve 51a the live steam may be passed through the pump 14 and connecting pipes exhausting into the sump 18.

The operation of my system is as follows:
Clear water from the city mains, usually of a temperature less than 60° F., enters the water motor 12 and is supplied through pipe 13 to the preheater 32. The waste water in commercial laundries, for example, is usually from 130° F. and higher, and is supplied by the pump 14 to the preheater 32. The circulation of the two waters through the preheater is in opposite directions thus insuring the maximum transfer of heat from the waste water to the clear water.

The clear water is subsequently led from the preheater 32 through the pipe line 52 to the master heater 53 where it is further heated by the exhaust steam from the plant boiler room. This water is usually sufficiently heated for plant requirements and may be taken from the master heater 53 directly to the factory requirements therefor.

At times it may be necessary to heat the water for factory requirements at a faster rate than is provided by the two heaters mentioned or to a higher temperature. For this purpose, I provide the auxiliary or instantaneous heater 54' which may be located in a branch of the hot water supply from the master heater. This heater is supplied with live steam from the boiler room or any other source. When the water is required to be heated through this auxiliary heater the same may be by-passed therethrough so that the use of this heater may become optional according to requirements. I have therefore provided a water heating system which is flexible in that it may use either two or three heaters according to demands, and I have arranged these heaters so as to utilize what are now normally waste products in a plant, namely, the heat in the waste water, and the heat in the exhaust steam of the boiler room, with resultant economy in the fuel required for operation of the plant.

My system does not add any costs to the operation of the plant since I utilize the incoming cold water supplied to all requirements of the plant, including the boiler room, to operate a water turbine which in turn operates a water pump to circulate the waste water. Since there may be times when the cold water requirements of the plant will not be sufficient to operate the water turbine, such as when the plant is closing down for the night, I provide an electric motor drive for the pump for discharging the waste water. This is automatically controlled by a float switch located in the sump into which the waste water discharges.

The method of draining and cleaning the system has been outlined above and need not be repeated here. However, the individual preheater units may be cleaned by plungers, by removing the cover plates 36, for which purpose the thumb screws 35 are provided.

The preheater units 31 are so designed and constructed that they may be suspended on the wall or ceiling of a plant and for this purpose any suitable supporting means may be used such as the racks 71 shown diagrammatically in Fig. 1.

Modifications may be made in the arrangement and location of parts but such modifications are within the spirit and scope of my invention and are intended to be covered by the appended claims.

I claim:

1. A system of heat interchange comprising, in combination, a source of cold liquid, a liquid motor connected to said source for actuation by said liquid, a source of heated liquid, a liquid pump connected to said source of heated liquid for pumping said heated liquid, and adapted to be actuated by the said motor, outlets for said motor and pump, and a heat interchanger connected with the outlets from said motor and pump.

2. A system of heat interchange comprising, in combination, a source of cold liquid, a source of heated liquid, a liquid motor and a liquid pump connected to said liquid sources, outlets for said motor and pump, an auxiliary electric motor for driving said pump, means for automatically energizing the electric motor when the liquid motor is not sufficiently actuating said pump, and a heat interchanger connected with the outlets from said motor and pump.

3. A system of heat interchange comprising, in combination, a source of steam supply, a source of cold liquid, a liquid motor connected to said source of cold liquid for actuation by said liquid, a source of heated liquid, a liquid pump connected to said source of heated liquid for pumping said heated liquid, and adapted to be actuated by the said motor outlets for said motor and pump, a heat interchanger connected with the outlets from said motor and pump, a heater, connections from the steam supply to the heater, and connections from the interchanger to the heater.

4. A system of heat interchange comprising, in combination, a source of cold liquid, a source of heated liquid, a source of steam supply, a liquid motor and a liquid pump connected to said liquid sources, outlets for said motor and pump, an auxiliary electric motor for driving said pump, means for automatically energizing the electric motor when the liquid motor is not sufficiently actuating said pump, a heat interchanger connected with the outlets from said motor and pump, a heater, connections from the steam supply to the heater, and connections from the interchanger to the heater.

5. A system for utilizing waste heat comprising a liquid motor, a drive shaft therefor, inlet and exhaust ports for said motor, a liquid pump yieldably connected to said drive shaft, said liquid pump provided with inlet and exhaust ports, an auxiliary electric motor also connected to said pump, means for automatically energizing the electric motor when the liquid motor is not sufficiently actuating said pump, a unitary two passage preheater adapted to be connected to the exhausts of said fluid motor and pump, a master heater connected to said fluid motor through one passage of said preheater, and means for heating said master heater.

6. A system of heat interchange comprising, in combination, a source of liquid to be heated, a source of heated liquid, a preheater, means whereby said liquids are passed separately through said preheater in heat exchanging relationship, a second independent heater, connections from the preheater to said second heater, an auxiliary heater, connections from said second heater to said auxiliary heater, and outlets from said second heater and said auxiliary heater to the hot water requirements.

7. A system for utilizing waste heats comprising a source of liquid to be heated, a liquid motor connected to same and actuated by said liquid, a sump into which is emptied waste liquid of a plant, a liquid pump connected to said sump for pumping the liquid therefrom and actuated by said motor, a preheater connected to the outlets of said pump and motor, an outlet for said waste liquid from said preheater to the sewer, an outlet from said preheater for said liquid to be heated, a second heater, connections from said second heater to said last mentioned outlet and to a source of exhaust steam from said plant, and connections from said second heater to the hot liquid requirements of the plant.

8. A system for utilizing waste heats comprising a source of liquid to be heated, a liquid motor connected to said source and actuated by said liquid, an outlet for said motor, a sump into which is emptied waste liquid of a plant, a liquid pump connected to said sump for pumping the liquid therefrom and actuated by said motor, an outlet for said pump, a preheater connected to the outlets of said pump and motor, an outlet for said waste liquid from said preheater to the sewer, an outlet from said preheater for said liquid to be heated, a second heater to said last mentioned outlet and connections from said second heater to a source of exhaust steam from said plant, connections from said second heater to the hot liquid requirements of the plant, a third heater, a source of live steam from said plant connected to said third heater, and connections from said third heater to the hot liquid requirements.

9. A system of heat interchange comprising a source of cold liquid, a liquid motor connected to said source for actuation by said liquid, a source of heated liquid, a liquid pump connected to said source of heated liquid for pumping said heated liquid, and adapted to be actuated by the said motor, outlets for said motor and pump, a heat interchanger connected with said outlets, a plurality of heaters, sources of steam supply connected to same, connections from the heat interchanger selectively through one or more of said heaters to a hot liquid outlet.

10. A system of heat interchange comprising in combination a main source of cold liquid under pressure, a source of heated liquid, a motor connected to said main source of cold liquid and actuated by said liquid, a liquid pump connected to the source of heated liquid for pumping said heated liquid and adapted to be actuated by said motor, outlets for said motor and pump, a supply pipe connected to the motor outlet for general cold liquid uses, and a heat interchanger connected with the outlets from the said motor and said pump.

11. A system of heat interchange comprising in combination a source of cold liquid, a liquid motor connected to said source for actuation by said liquid, a source of heated liquid, a liquid pump connected to said source of heated liquid for pumping said heated liquid and adapted to be actuated by said motor, outlets for said motor and pump, an auxiliary motor for driving said pump, means for automatically operating said auxiliary motor when the liquid motor is not sufficiently actuating said pump, and a heat interchanger connected with the outlets from said liquid motor and pump.

12. A system of heat interchange comprising in combination a source of cold liquid, a liquid motor connected to said source for actuation by said liquid, a receptacle for heated liquid, an outlet for said receptacle, a liquid pump connected to said receptacle outlet for pumping said heated liquid and adapted to be actuated by said motor, outlets for said motor and pump, an auxiliary motor for driving said pump, means dependably operable upon variations in the height of the liquid in said receptacle for controlling the auxiliary motor, and a heat interchanger connected with the outlets from said liquid motor and pump.

In testimony whereof I affix my signature.

GEORGE T. JACOCKS.